J. DI SALVO.
BUMPER BAR AND SUPPORT THEREFOR.
APPLICATION FILED JULY 6, 1920.
1,363,850.
Patented Dec. 28, 1920.
2 SHEETS—SHEET 1.
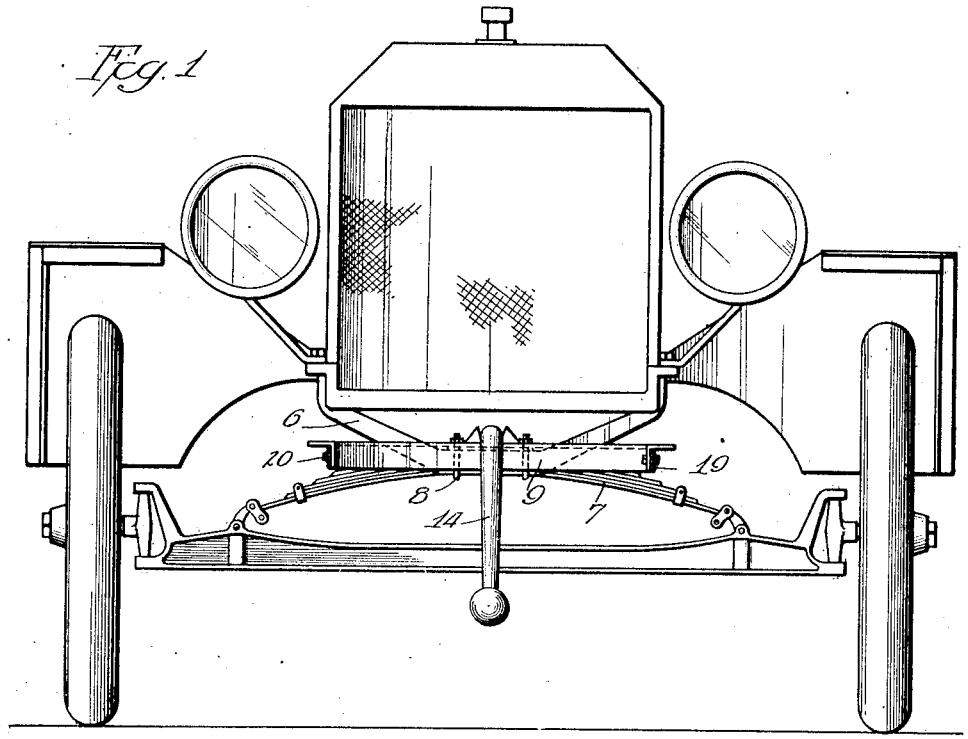
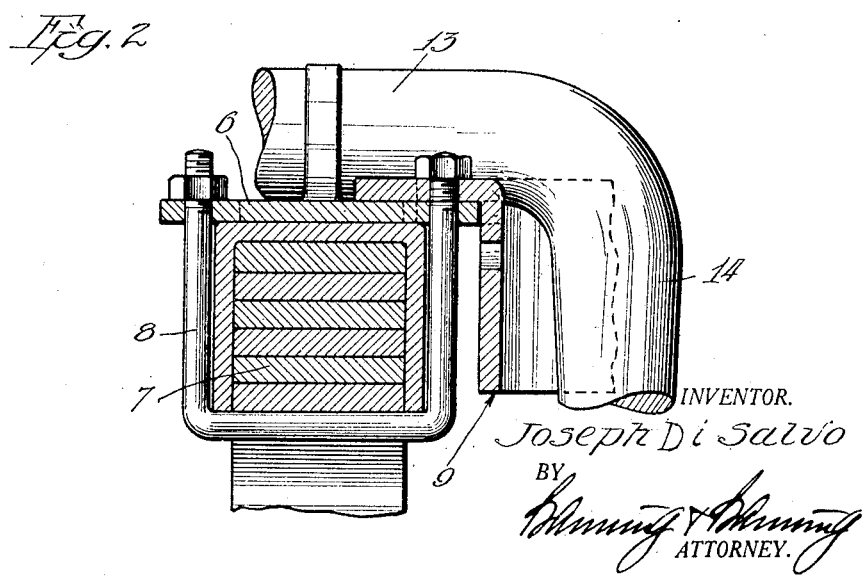
INVENTOR.
Joseph Di Salvo
BY
ATTORNEY.

J. DI SALVO.
BUMPER BAR AND SUPPORT THEREFOR.
APPLICATION FILED JULY 6, 1920.
1,363,850.
Patented Dec. 28, 1920.
2 SHEETS—SHEET 2.
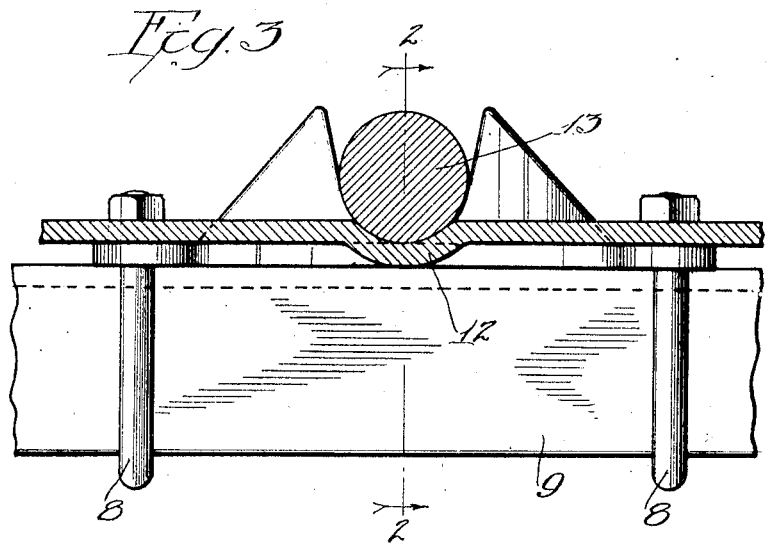
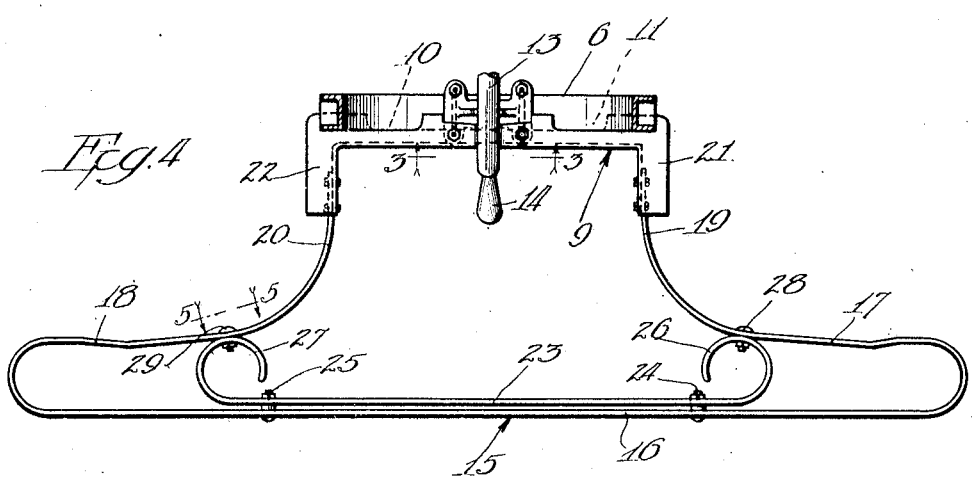
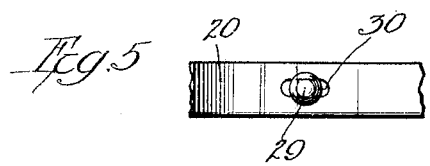
INVENTOR.
Joseph Di Salvo
BY
ATTORNEY

UNITED STATES PATENT OFFICE.

JOSEPH DI SALVO, OF CHICAGO, ILLINOIS, ASSIGNOR TO GIANT AUTO BUMPER CO., INC., OF CHICAGO, ILLINOIS, A CORPORATION OF ILLINOIS.

BUMPER-BAR AND SUPPORT THEREFOR.

1,363,850.  Specification of Letters Patent.  Patented Dec. 28, 1920.

Application filed July 6, 1920. Serial No. 394,190.

*To all whom it may concern:*

Be it known that I, JOSEPH DI SALVO, a citizen of the United States, residing at Chicago, in the county of Cook and State of Illinois, have invented certain new and useful Improvements in Bumper-Bars and Supports Therefor, of which the following is a specification.

The present invention has to do with improvements in automobile bars and supports therefor. The invention has reference particularly to devices of this kind intended for use particularly on automobiles of a certain construction; but I wish it clearly understood that said features are not limited to use in conjunction with this particular or any other form of automobile. However, in order that the features of the invention may be better understood and appreciated, I have illustrated them as being used in conjunction with a so-called Ford automobile.

One of the objects of the invention is to provide a bumper bar support of such form that it can be readily attached to the front portion of the frame of the Ford car without the necessity of changing any portion of the ordinary and usual construction of such car; and in this connection, another object is to provide a bumper bar support of such form that it can be attached to the aforesaid automobile frame by means of the bolts or clips which are ordinarily present and used in the frames of cars of this type.

Another object of the invention is to provide a bumper bar support of such form that the shock of a collision or other impact may be very directly transmitted between the frame and the bumper bar itself so as to most effectively protect the car against injury.

Another object of the invention is to provide a support of such construction that it can be very easily and cheaply made from iron or steel sections and with a minimum amount of machine work or other fabrication.

Other objects and uses of the invention will appear from a detail description of the same which consists in the features of constructions and combinations of parts hereinafter described and claimed.

In the drawings:

Figure 1 shows a front elevation of a Ford car having attached thereto a bumper bar support embodying the features of the present invention, the bumper bar itself being removed;

Fig. 2 shows an enlarged detail section taken on the line 2—2 of Fig. 3 looking in the direction of the arrows;

Fig. 3 shows an enlarged fragmentary section taken on the line 3—3 of Fig. 4 looking in the direction of the arrows;

Fig. 4 shows a plan view of the bumper bar support of the present invention having applied thereto an improved form of bumper bar itself; and Fig. 5 shows a fragmentary face view taken on the line 5—5 of Fig. 4 looking in the direction of the arrows.

Referring first to Fig. 1 there will be observed the saddle 6 which supports the front portion of the frame of the machine, the center portion of said saddle resting on the front spring 7. The central portion of this saddle is flattened as is clearly shown in Fig. 2, and is ordinarily secured to the center of the spring 7 by means of the clips or saddle bolts 8. The construction so far illustrated and described is known and understood in the art.

The bumper bar support which constitutes one of the features of the present invention is of U-shape as shown at 9 in Fig. 4. It is conveniently formed of L-section as clearly evident from Fig. 2 so as to give additional stiffness combined with lightness.

The back portion of the member 9 is preferably provided with a pair of elongated slots or notches 10 and 11 as clearly shown in Fig. 4; so that when the bumper bar support is set into position the side portions of the saddle 6 will rise up through said slots to meet the frame of the machine.

The central portion of the top plate of the bumper bar support 9 is conveniently recessed or depressed as shown at 12 in Fig. 3 so as to accommodate the crank stem 13 of the crank 14.

The bumper bar support is conveniently held in place on the saddle by means of the same clips of U-bolts 9 as are used for securing the saddle itself to the front spring; thus making unnecessary any special provision or means for securing the support in place.

The bumper bar is designated in its entirety by the numeral 15. It comprises an outer member of spring steel having a cross front plate 16, the end portions of which are bent back at 17 and 18 and then curved to the rear as at 19 and 20 so that they can be directly attached to the forwardly projected arms 21 and 22 of the bumper bar support. For this reason the portions 19 and 20 of the bumper bar preferably seat flat against the vertical webs of the bumper bar support and beneath the horizontal flanges thereof.

Another plate of spring steel or the like 23 is seated behind the front portion 16 to which it is secured by means of the bolts 24 and 25; and the end portions 26 and 27 of the plate 23 are curved inwardly and against the inturned portions 17 and 18 of the main plate. The curved portions 26 and 27 of the plate 23 are connected to the portions 17 and 18 of the main plate by means of the bolts 28 and 29; but one of the members is slotted as shown at 30 in Fig. 5 so that when the bumper bar is subjected to strain a certain amount of movement may take place in order to take up the strain by a deflecting action under spring pressure.

While I have herein shown and described only a single embodiment of the features of my invention, still I do not limit myself to the said features except as I may do so in the claims.

I claim:

1. In an automobile the combination with the transverse front spring and the transversely extending frame saddle resting upon and supported by the center thereof, of a bumper bar support comprising a U-shaped member of L-shaped cross section having its arms extending forwardly and having the horizontal flange of its central member resting upon and supported by the central portion of the saddle aforesaid, there being suitable recesses in said horizontal flange for the accommodation of the upwardly extending portions of the saddle, and the rear portion of the U-shaped member having its upper face centrally depressed for the accommodation of the starting crank, clips extending through the horizontal flange of the rear portion of the bumper bar support and engaging the saddle and spring to hold the parts together, and a bumper bar of generally U-shaped form having its arms lying against and secured to the vertical webs of the forwardly extending arms of the U-shaped member, substantially as described.

2. In an automobile the combination with the transverse front spring and the transversely extending frame saddle resting upon and supported by the center thereof, of a bumper bar support comprising a U-shaped member of L-shaped cross section having its arms extending forwardly and having the horizontal flange of its center member resting upon and supported by the center portion of the saddle aforesaid, there being suitable recesses in said horizontal flange for the accommodation of the upwardly extending portions of the saddle, clips extending through the horizontal flange of the rear portion of the bumper bar support and engaging the saddle and spring to hold the parts together, and a bumper bar of generally U-shaped form having its arms lying against and secured to the vertical webs of the forwardly extending arms of the U-shaped member, substantially as described.

3. In an automobile the combination with the transverse front spring and the transversely extending frame saddle resting upon and supported by the center thereof, of a bumper bar support comprising a U-shaped member of L-shaped cross section having its arms extending forwardly and having the horizontal flange of its central member in engagement with the central portion of the saddle aforesaid, clips joining rear portion of the bumper bar support and the saddle and spring together, and a bumper bar of generally U-shaped form having its arms lying against and secured to the vertical webs of the forwardly extending arms of the U-shaped member, substantially as described.

JOSEPH DI SALVO.